United States Patent [19]

Conner et al.

[11] 3,893,812

[45] July 8, 1975

[54] REGENERATION APPARATUS WITH EXTERNAL REGENERATED-CATALYST RECYCLE MEANS

[75] Inventors: Algie J. Conner, Downers Grove; Daniel Dudych, Des Plaines; Willas L. Vermilion, Arlington Heights, all of Ill.

[73] Assignee: Universal Oil Products Company, Des Plaines, Ill.

[22] Filed: Dec. 28, 1973

[21] Appl. No.: 429,421

Related U.S. Application Data

[63] Continuation-in-part of Ser. No. 258,135, May 30, 1972, Pat. No. 3,843,330.

[52] U.S. Cl.............. 23/288 B; 23/288 S; 208/164; 252/417
[51] Int. Cl.................................................. B01j 9/20
[58] Field of Search........ 23/288 B, 288 S; 208/164; 252/417

[56] References Cited
UNITED STATES PATENTS

| | | | |
|---|---|---|---|
| 3,290,241 | 12/1966 | Wickham et al. | 23/288 S |
| 3,677,715 | 7/1972 | Morrison et al. | 23/288 S |

*Primary Examiner*—James H. Tayman, Jr.
*Attorney, Agent, or Firm*—James R. Hoatson, Jr.; Thomas K. McBride; William H. Page, II

[57] ABSTRACT

A spent-catalyst receiving chamber for containing a dense bed of fluidized catalyst in which spent catalyst is oxidized to produce regenerated catalyst and partially spent regeneration gas; a substantially vertical transfer conduit through which said gas and said catalyst pass and in which carbon monoxide is essentially completely converted to carbon dioxide to produce spent regeneration gas and regenerated catalyst at an increased temperature; a regenerated-catalyst receiving chamber for containing a dense bed of regenerated catalyst and in which spent regeneration gas and regenerated catalyst are separated; and, an external regenerated-catalyst recycle means by which hot regenerated catalyst can be recycled from the dense bed of regenerated catalyst in the regenerated-catalyst receiving chamber to the dense bed of catalyst in the spent-catalyst receiving chamber in amounts to control the temperature and hence the rate of coke oxidation in the spent-catalyst receiving chamber.

5 Claims, 1 Drawing Figure

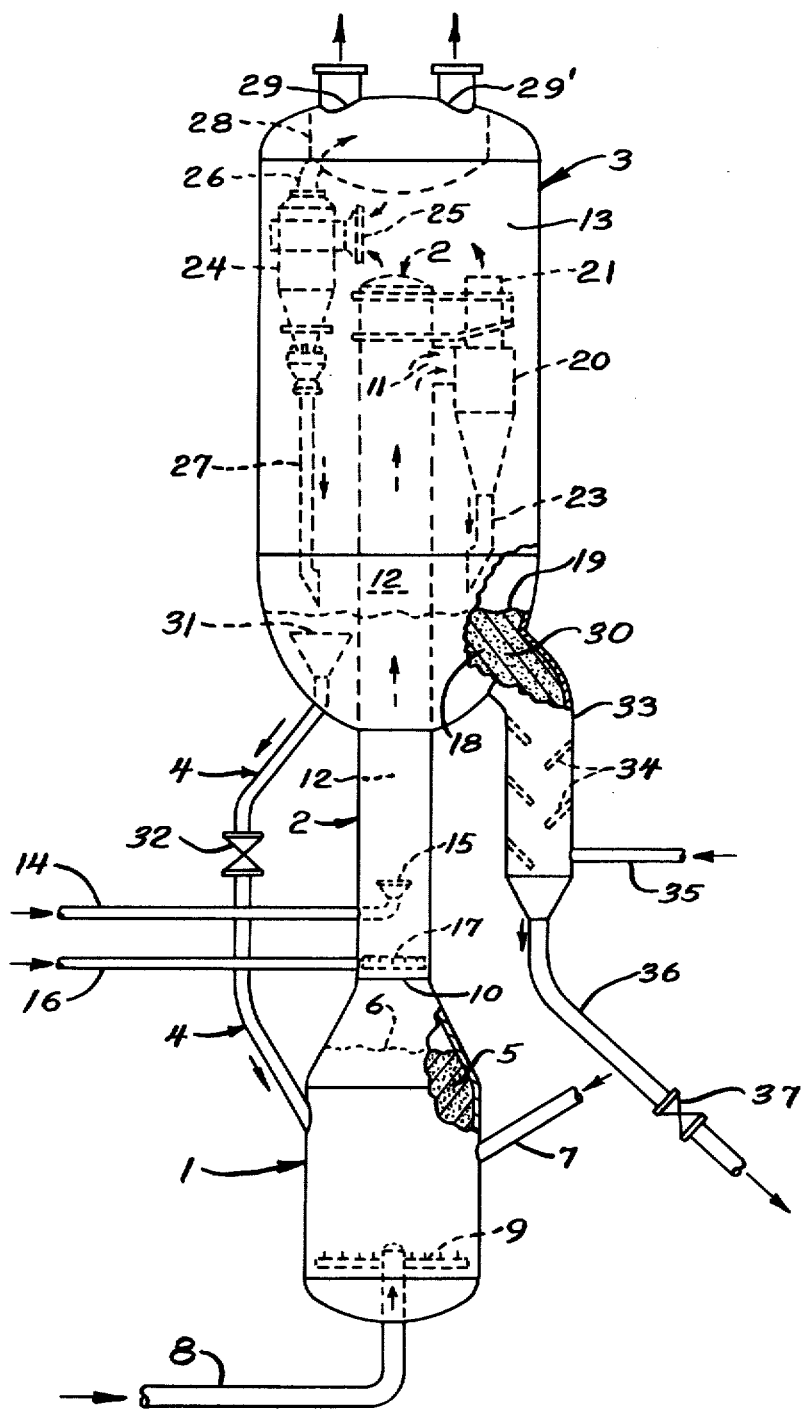

3,893,812

REGENERATION APPARATUS WITH EXTERNAL REGENERATED-CATALYST RECYCLE MEANS

This application is a continuation-in-part of our copending application Ser. No. 258,135 filed on May 30, 1972 now issued as U.S. Pat. No. 3,843,330 on Oct. 22, 1974. All of the teachings of said copending application are incorporated herein by specific reference thereto.

BACKGROUND OF THE INVENTION

1. Field of the Invention

The field of art to which this invention pertains is catalyst regeneration apparatus. More specifically, the present invention relates to a regeneration apparatus which is applicable for use in regenerating fluidizable catalytic cracking catalyst which has become spent by deposition of coke thereon.

2. Description of the Prior Art

In most regeneration processes presently employed the oxidation of coke from spent catalyst is done in a single-chamber regeneration apparatus containing one or more dense beds located in the bottom of the apparatus with a large dilute-phase disengaging space positioned above and in connection with the dense bed. In this type of regeneration process the dense bed is maintained in the bottom portion of the apparatus by limiting the superficial velocity of the incoming fresh regeneration gas to the transport velocity, that is, the velocity above which large amounts of catalyst would be carried out of the dense bed to the disengaging space. Typical velocities are therefore less than about 3 feet per second with 1.5 to 2.5 being the usual range. Provisions are made for recovering and returning to the dense bed any catalyst entrained in the flue gas effluent passing from the dense bed. This is generally carried out by passing this effluent flue gas containing entrained catalyst through separation means such as cyclone separation devices located in the disengaging space and returning separated catalyst to the same dense bed. Average residence time of the catalyst within the apparatus per pass through the apparatus is generally in the two to five minute range with 2 to 3 minutes being the more common, while the residence time of gas is generally within the range of 10 to 20 seconds. All of the regenerated catalyst is returned directly from the regeneration apparatus to the reaction zone without additional passes through any part of the regeneration apparatus.

It is also present practice to operate conventional regeneration apparatus in a manner to preclude the essentially complete combustion of the CO that is produced by coke oxidation. This is generally done by controlling the oxygen-containing gas stream introduced to such regeneration apparatus directly responsive to a rather small predetermined temperature differential between the flue gas outlet or the disengaging space and the dense bed of the regeneration apparatus. Excess oxygen within the regeneration apparatus is thus minimized thereby severely limiting CO afterburning to only that amount characterized by the small temperature differential.

Since the conversion of CO to $CO_2$ is quite exothermic, this restricting of CO afterburning is done for the very practical reason of avoiding the damaging effects of excessively high temperatures in the upper disengaging space region of the regeneration apparatus where there is little catalyst present to act as a heat sink. This practice, as exemplified by Pohlenz U.S. Pat. Nos. 3,161,583 and 3,206,391, produces a small amount of oxygen in the flue gas, generally in the range of about 0.1 to 1% oxygen, results in the flue gas containing from about 7 to about 14 vol. % CO and limits the temperatures achieved in the regeneration apparatus to a maximum of about 1275° F. Present industry practice is to direct the flue gas containing CO to the atmosphere or to a CO boiler where it is used as fuel to make steam.

Controlling the amount of fresh regeneration gas to permit a slight amount of afterburning and the once-through flow of catalyst through the regeneration apparatus essentially fixes the degree of catalyst regeneration, that is, the amount of residual coke on regenerated catalyst. Although it is widely known that the residual coke content on regenerated catalyst has a great influence on the conversion and product distribution obtained in the reaction zone, residual coke level on regenerated catalyst produced by present regeneration processes conducted in conventional regeneration apparatus is not an independent variable but is fixed by regeneration apparatus design at a level typically from about 0.05 to about 0.4 wt. % carbon, and more often from about 0.15 to about 0.35 wt. % carbon.

The apparatus of our invention provides for essentially complete combustion within the apparatus of the CO produced and for recovery within the apparatus of at least a portion of the heat of combustion. This is distinguished from conventional regeneration apparatus which permit only small limited amounts of CO afterburning with essentially no recovery of the potential chemical heat within the apparatus. Our invention recognizes the differences in the kinetics of coke oxidation and CO oxidation and provides separate regions within the regeneration apparatus for each to take place. Coke is oxidized primarily in a dense bed of fluidized catalyst in the spent-catalyst receiving chamber to produce regenerated catalyst and partially spent regeneration gas which are passed through a transfer conduit where essentially complete CO oxidation takes place and where heat of combustion is transferred to the regenerated catalyst passing through that zone. The resulting hot regenerated catalyst and spent regeneration gas are separated within a regenerated-catalyst receiving chamber and the regenerated catalyst is directed to a dense bed in the bottom portion of the regenerated-catalyst receiving chamber.

An external regenerated-catalyst recycle means is provided to return hot regenerated catalyst from the dense bed of catalyst in the regenerated-catalyst receiving chamber to the dense bed of catalyst in the spent-catalyst receiving chamber in amounts to control the temperature in the spent-catalyst receiving chamber and hence the rate of coke oxidation. The increased rate of reaction and catalyst residence time within the spent-catalyst receiving chamber result in regenerated catalyst having lower levels of residual coke. Additionally, the rate of CO burning in the transfer conduit is also increased because of the higher inlet temperature thereby producing lower CO concentrations in the spent regeneration gas leaving the apparatus. The remainder of the regenerated catalyst from the regenerated-catalyst receiving chamber is returned to the reaction zone at a higher temperature which permits reduced feed preheat requirements.

SUMMARY OF THE INVENTION

It is, accordingly, a broad objective of the present invention to provide a catalyst regeneration apparatus comprising a spent-catalyst receiving chamber, a transfer conduit, a regenerated-catalyst receiving chamber, and an external regenerated-catalyst recycle means uniquely and advantageously arranged to offer features not found in present regeneration apparatus.

More specifically, it is an object of the present invention to present a catalyst regeneration apparatus in which CO can be essentially completely converted to $CO_2$ in a manner in which at least a portion of the heat of combustion can be recovered within the apparatus and in which the rate of coke oxidation can be controlled by the external recycle of hot regenerated catalyst.

Our invention can be briefly summarized as a catalyst regeneration apparatus comprising in combination: (a) a spent-catalyst receiving chamber for containing a dense-phase fluidized bed of catalyst having a spent-catalyst inlet means and a fresh-regeneration-gas inlet means connected to said chamber to allow passage of spent catalyst and fresh regeneration gas respectively into said chamber and having a regenerated-catalyst/regeneration-gas outlet means connected to said chamber to allow passage of regenerated catalyst and regeneration gas from said chamber; (b) a transfer conduit, having an inlet at its lower end connected to said regenerated-catalyst/regeneration-gas outlet means, extending vertically upward through the lower portion of a hereinafter described regenerated-catalyst receiving chamber into said chamber and having an outlet near its upper end within said receiving chamber whereby regenerated catalyst and regeneration gas are carried from said spent-catalyst receiving chamber to said regenerated-catalyst receiving chamber; (c) a regenerated-catalyst receiving chamber for containing a dense-phase bed of catalyst having a regenerated-catalyst outlet means and a spent-regeneration-gas outlet means connected to said chamber to allow passage of regenerated catalyst and spent regeneration gas from said chamber; and (d) an external regenerated-catalyst recycle means to allow passage of regenerated catalyst from the regenerated-catalyst receiving chamber to the spent-catalyst receiving chamber.

Other embodiments and objects of the present invention encompass further details such as the function and arrangement of these various elements all of which are hereinafter disclosed in the following discussion of each of these facets of the invention.

DESCRIPTION OF THE DRAWING

Having thus described the apparatus of our invention in brief general terms, reference is now made to the drawing depicting the side view of the apparatus.

While the invention will be described in connection with a preferred embodiment, it will be understood that it is not intended to limit the invention to that embodiment. On the contrary, it is intended to cover all alternatives, modifications and equivalents as may be included within the scope of the invention as defined by the appended claims. It will be understood that the drawing is only shown in such detail as is necessary for an understanding of the invention and that various items such as minor valves, bleed and dispersion steam lines, expansion joints, instrumentation and other control means have been ommitted for the sake of simplicity.

The drawing shows the apparatus of our invention which basically comprises a spent-catalyst receiving chamber 1, a transfer conduit 2, a regenerated-catalyst receiving chamber 3, and an external regenerated-catalyst recycle means 4.

Spent-catalyst receiving chamber 1, shown in the lower portion of the FIGURE, has a dense-phase fluidized bed of catalyst 5, having a level or interface 6, maintained within the chamber. Attached to spent-catalyst receiving chamber 1 are shown spent-catalyst inlet means 7 and a fresh-regeneration-gas inlet means 8. Spent catalyst from a reaction zone (not shown) is continuously introduced to the dense bed 5 via spent-catalyst inlet means 7. A controlled stream of fresh regeneration gas is continuously introduced via fresh-regeneration-gas inlet means 8 into bed 5 through distributing means 9 which allows the fresh regeneration gas to be more readily dispersed within the dense bed 5. Typically the distributing means can be a metal plate containing holes or slots or preferably a pipe-grid arrangement, both types of which are familiar to those skilled in the art. Oxidation of the carbonaceous deposits on the spent catalyst takes place in dense bed 5 to produce partially spent regeneration gas and spent catalyst both of which pass out of chamber 1 in admixture through regenerated-catalyst/regeneration-gas outlet means 10, located at the top of chamber 1, and into transfer conduit 2 wherein CO oxidation takes place to produce spent regeneration gas and where the heat of combustion of the carbon monoxide to carbon dioxide is transferred to the catalyst being transported.

Transfer conduit 2 has an inlet 10 at its lower portion which is connected to the regenerated-catalyst/regeneration-gas outlet means of chamber 1. The inlet of conduit 2 is labeled 10 as is the regenerated-catalyst/regeneration-gas outlet means since they are in communication with each other. Transfer conduit 2 extends vertically upward through the lower portion of regenerated-catalyst receiving chamber 3. Conduit 2 has outlet means 11, which may comprise single or multiple openings, near its upper portion to allow catalyst and regeneration gas passing through volume 12 within conduit 2 to pass out of the conduit.

An external combustible fluid such as fuel gas or a liquid hydrocarbon stream may be admitted into the volume 12 within conduit 2 through optional combustible-fluid inlet means 14. The burning of such a fluid within volume 12 may be necessary to assist in initial process start-up, to increase the temperature within volume 12 sufficiently to initiate carbon monoxide oxidation, or to increase the temperature of the catalyst particles passing through the conduit beyond that which could be achieved by CO burning alone. Although not shown in the FIGURE, additional combustible fluid could be added to chamber 1 for some of or all of the above reasons. Optional distribution means 15 can be used to help distribute combustible fluid across the cross-sectional area of the transfer conduit 2.

Additionally, a second stream of fresh regeneration gas may be admitted into volume 12 through optional fresh-regeneration-gas inlet means 16. This fresh regeneration gas stream may be for the purpose of supplying needed oxygen to support burning of the external combustible fluid or to insure the essentially complete combustion of CO within transfer conduit 2. Optional distribution means 17 can be used to help distribute the fresh regeneration gas across the cross-sectional area of the transfer conduit 2.

Regenerated-catalyst receiving chamber 3 contains a dilute-phase disengaging space 13 and a dense bed of regenerated catalyst 18, having a level or interface located at 19, in the lower portion of the chamber. Transfer conduit 2 extends upward through the bottom portion of regenerated-catalyst receiving chamber 3 into volume 13 and has an outlet means 11 near its upper end located above interface 19 of dense bed 18. Outlet means 11 will be directly connected to or in communication with a separation means whereby catalyst and regeneration gas passing out of conduit 2 can be separated. Separation means which can be employed shall include: a disengaging space by itself in which separation of regenerated catalyst and spent regeneration gas takes place by a sudden decrease in velocity of the mixutre of catalyst and gas leaving outlet means 11; cyclone separation means arranged in parallel or series flow arrangements to achieve the desired degree of separation; or, combinations of a disengaging space and cyclone separation means. In the preferred embodiment indicated in the drawing one or more outlet means 11, of transfer conduit 2 will be directly connected to the inlet of one or more first cyclone separation means 20. The inlet to cyclone separation means 20 is also indicated as 11 since the outlet of conduit 2 and the cyclone-separation-means inlet are in communication with each other. Regenerated catalyst and spent regeneration gas in admixture will therefore pass out of conduit 2 directly into cyclone separation means 20. Separated spent regeneration gas passes out of cyclone separation means 20 through outlet 21 into dilute-phase disengaging space 13 while separated regenerated catalyst passes out of separation means 20 through dipleg 23 directed downward toward dense bed 18.

As shown in the drawing one or more second cyclone separation means 24 having inlet 25 will be located in disengaging space 13 within chamber 3 to receive and separate regeneration gas and any entrained catalyst located in disengaging space 13. In the preferred embodiment inlet 25 of second cyclone separation means 24 will be located adjacent to but not directly connected to the outlet 21 of first cyclone separation means 20. Inlet 25 and oulet 21 will be separated by a portion of disengaging space 13. We have found this arrangement is preferred to minimize possible overloading of both first cyclone separation means 20 and second cyclone separation means 24 during any upset operations. If both cyclone separation means are overloaded rather high catalyst losses from the apparatus can result.

Regeneration gas and any entrained catalyst are substantially separated from each other in second cyclone separation means 24 with the spent regeneration gas passing out of cyclone separation means 24 at outlet 26, and into plenum chamber 28 and then out of the apparatus via spent-regeneration-gas outlet means 29 and 29'. Catalyst separated from the regeneration gas is passed via dipleg 27 downward toward dense bed 18.

Regenerated catalyst in dense bed 18 moves in a downward direction and passes out of regenerated-catalyst receiving chamber 3 through both outlet means 30 and through external regenerated-catalyst recycle means 4.

External regenerated-catalyst recycle means 4 is connected to the bottom portion of regenerated-catalyst receiving chamber 3 and to spent-catalyst receiving chamber 1 to allow regenerated catalyst to be directly recycled from chamber 3 to chamber 1. It is of course recognized that the same purpose could be achieved if recycle means 4 were connected to spent-catalyst inlet means 7 rather than to spent-catalyst receiving chamber 1. Optional collection means 31 located within dense bed 18 can be used to help direct regenerated catalyst from dense bed 18 into regenerated-catalyst recycle means 4.

External regenerated-catalyst recycle means 4 will typically comprise one or more conduits having control means 32 located thereon to control the amount of regenerated catalyst recycled. The control means 32 would generally be a slide valve whose design and operation is well known to those skilled in the art of fluidized catalyst handling.

The remainder of the regenerated catalyst not recycled to chamber 1 will leave regenerated-catalyst receiving chamber 3 through outlet means 30 and be returned to the reaction zone where the catalyst will again become contaminated with coke.

In a preferred embodiment, as indicated in the drawing, a regenerated-catalyst stripper 33 will be connected to chamber 3 to allow stripping of interstitial and adsorbed regeneration gas from the catalyst prior to its being returned to the reaction zone. Since the chamber 3 outlet means and the inlet of the stripper 33 are in communication with each other they are both labeled in the drawing as 30. Regenerated catalyst will pass downward over baffles 34 and will be countercurrently stripped by a stripping medium which enters stripper 33 through inlet means 35. Generally the stripping medium will be steam. Stripped regenerated catalyst will then leave stripper 33 and pass to the reaction zone via conduit 36. Control means 37 may be located on conduit 36 to control the rate of withdrawal of stripped regenerated catalyst. Typically control means 37 will be a slide valve which is operated by a reaction-zone temperature or level controller.

DESCRIPTION OF THE INVENTION

At the outset the definitions of various terms will be useful in making clear the operation, objects, and advantages of the apparatus of our invention as herein described.

The term "spent catalyst" as used in the claims and specification shall mean catalyst withdrawn from a reaction zone because of reduced activity caused by coke deposits. Spent catalyst can obtain anywhere from a few tenths up to about 5 wt. % coke but typically in FCC operations spent catalyst will contain from about 0.5 to about 1.5 wt. % coke.

The term "regenerated catalyst" as used herein shall mean catalyst from which the majority of coke has been removed by oxidation in a regeneration apparatus. Regenerated catalyst produced by the apparatus of our invention will typically contain from about 0.01 to about 0.2 wt. % coke and more specifically from about 0.0 to about 0.1 wt. % coke.

The term "regeneration gas" shall mean, in a generic sense, any gas which is to contact catalyst or which has contacted catalyst within the regeneration apparatus.

Specifically, the term "fresh regeneration gas" shall include oxygen-containing gases such as air or oxygen-enriched or deficient air which pass into the regeneration apparatus to allow oxidation of coke on the spent catalyst. "Partially spent regeneration gas" shall refer to regeneration gas which has contacted catalyst within the spent-catalyst receiving chamber (hereinafter described) and which contains a reduced quantity of free oxygen as compared to fresh regeneration gas. Typically, the partially spent regeneration gas contains water, nitrogen, oxygen, carbon monoxide and carbon dioxide.

The term "essentially complete combustion of CO" as used herein shall mean that the CO content of the regeneration gas leaving the regeneration apparatus has been reduced to and maintained at a concentration of less than about 2000 ppm. and generally less than about 500 ppm.

"Spent regeneration gas" therefore shall mean regeneration gas leaving the regeneration apparatus which contains less than about 2000 ppm. carbon monoxide, carbon dioxide, nitrogen, water and from about a few tenths up to as much as 15 mole % free oxygen. Generally spent regeneration gas will contain less than about 500 ppm. CO.

The basic components of the regeneration apparatus of our invention hereinafter described in more detail, are briefly defined as follows. The term "spent-catalyst receiving chamber" shall mean a chamber for containing a dense-phase fluidized bed of catalyst wherein the majority of coke is oxidized. The term "transfer conduit" as used herein shall mean a conduit in which essentially complete CO conversion takes place in the presence of dilute-phase fluidized catalyst to produce spent regeneration gas. The term "regenerated-catalyst receiving chamber" shall mean a chamber for separating regenerated catalyst and spent regeneration gas and for containing a dense-phase bed of regenerated catalyst. "External regenerated-catalyst recycle means" shall mean that portion of the regeneration apparatus by which a portion of regenerated catalyst is recycled from the dense-phase bed of regenerated catalyst withn the regenerated-catalyst receiving chamber to the dense-phse fluidized bed of catalyst within the spent-catalyst receiving chamber. The word "external" is used to characterize the recycle means as being "outside of" or "external to" any other portion of the regeneration apparatus.

In regeneration apparatus now most frequently used in fluid catalytic cracking processes, CO resulting from the oxidation of coke, is not essentially completely oxidized to $CO_2$. Spent catalyst is introduced into the regeneration apparatus wherein catalyst is maintained in a dense bed for average catalyst residence times of two minutes or more by limiting the superficial velocity of the incoming fresh regeneration gas. Coke is oxidized to produce regenerated catalyst and partially spent regeneration gas which are directed out of the regeneration apparatus. Regenerated catalyst produced by present processes is neither stripped of adsorbed and interstitial regeneration gas nor recycled for any purpose within the regeneration apparatus.

More specifically, in present-used regeneration apparatus, the amount of fresh regeneration gas admitted to the apparatus is typically controlled by a predetermined temperature differential between the gas outlet section of the regeneration apparatus and either the dense bed temperature or a dilute phase temperature within the apparatus. Such control scheme minimizes excess oxygen and allows only a small amount of afterburning, that is, only that amount characterized by the temperature differential to take place; indeed, its purpose is to prevent significant CO combustion. Since there is essentially no combustion of CO, temperatures within the regeneration apparatus will generally not be higher than about 1275° F. with the usual range being from about 1150° F. to about 1250° F. When such a control scheme is used, the amount of residual coke left on regenerated catalyst is largely a function of regeneration apparatus design, that is, how well gas and solids are mixed, the number of stages used, the residence time and the resulting temperature. Typically regenerated catalyst will contain less than about 0.5 wt. % coke and usually from about 0.15 to about 0.35 wt. % coke while spent catalyst entering the regeneration apparatus generally contains from about 0.5 to 1.5 wt. % coke. Partially spent regeneration gas is separated from entrained regenerated catalyst by cyclone separation means located within the regeneration apparatus and separated gas containing CO is passed from the regeneration apparatus either directly to the atmosphere or to a carbon monoxide boiler where the chemical heat of carbon monoxide is recovered externally to the regeneration apparatus by combustion as a fuel for the production of steam. Separated regenerated catalyst is returned to the bottom portion of the regeneration apparatus and regenerated catalyst then leaves the apparatus, with no prior stripping of regeneration gas, and contacts the feed stock in a reaction zone.

In a typical regeneration apparatus the spent catalyst is maintained in the bottom portion of the apparatus in one or more dense beds by limiting the superficial velocity of the incoming fresh regeneration gas. The superficial velocity is limited to the transport velocity, that is, the velocity above which large amounts of catalyst would be carried out of the dense bed to the cyclones. Typical velocities are therefore less than about 3 feet per second with about 1.5 to about 2.5 being the usual range.

It is this limit on superficial velocity which produces the rather large catalyst inventories found in conventional regeneration apparatus. The determination of the inventory in a typical regeneration apparatus is based upon the feed rate to the FCC process (or more specifically to the coke yield from that feed rate) and the superficial velocity in the regeneration apparatus. This coke yield anticipated from a desired feed rate determines the rate of the fresh regeneration gas to the regeneration apparatus. This gas rate at a limiting superficial velocity then determines the cross-sectional area of the regeneration apparatus. With a known catalyst density and height of the dense bed the inventory of the regeneration apparatus, and for practical purposes for the FCC process, is fixed. Catalyst residence times which result are generally from about 2 to 5 minutes with about 2 to 3 being the general range.

Since catalyst makeup rates required to make up losses and maintain catalyst activity tend to be a percentage of the total catalyst inventory, these rates for FCC processes with conventional regenerators are rather high.

Thus the typical regeneration apparatus as presently designed and operated has these disadvantages: no provision is made for the essentially complete conversion of CO to $CO_2$ within the apparatus and a CO disposal problem thus arises; with CO conversion essentially precluded, the coke oxidation temperature cannot be increased without burning external torch oil within the apparatus; the regenerated catalyst produced still contains significant amounts of residual coke; and, catalyst inventories tend to be rather large.

In the apparatus of our invention coke from spent catalyst is efficiently oxidized to produce regenerated catalyst having very low residual coke levels and CO produced is essentially completely converted to $CO_2$ with at least a portion of the heat of combustion being recovered within the apparatus. More specifically, efficient oxidation is achieved by employing superficial velocities higher than the critical velocity and by recycling a portion of hot regenerated catalyst from the regenerated-catalyst receiving chamber back to the spent-catalyst receiving chamber where the majority of coke oxidation occurs.

Very broadly, our apparatus comprises a spent-catalyst receiving chamber, a transfer conduit, a regenerated-catalyst receiving chamber and an external regenerated-catalyst recycle means.

Spent catalyst and regeneration gas are passed through their respective inlet means into the spent-catalyst receiving chamber and coke is oxidized to produce regenerated catalyst and partially spent regeneration gas. Regeneration gas and regenerated catalyst are transported from the spent-catalyst receiving chamber through a regenerated-catalyst/regeneration-gas outlet means into a substantially vertical transfer conduit where essentially complete CO oxidation takes place and where at least a portion of the heat of combustion of the CO is transferred to the catalyst. Catalyst residence time in the transfer conduit is sufficiently short to preclude further substantial oxidation of the residual coke and additional production of CO. Catalyst and spent regeneration gas leave the transfer conduit and are separated by separation means located within the regenerated-catalyst receiving chamber. Separated regenerated catalyst passes to a dense bed of catalyst in the bottom portion of the regenerated-catalyst receiving chamber and spent regeneration gas passes out of the chamber and out of the regeneration apparatus through spent regeneration gas outlet means. A portion of the hot regenerated catalyst is then recycled via the external regenerated-catalyst recycle means from the dense-phase bed of regenerated catalyst in the regenerated-catalyst receiving chamber to the dense-phase fluidized bed of catalyst in the spent-catalyst receiving chamber to increase the temperature within the latter chamber thereby increasing the rate of coke oxidation and indirectly increasing the rate of CO oxidation in the transfer conduit. The remainder of the regenerated catalyst is returned from the regenerated-catalyst receiving chamber to the reaction zone through a regenerated-catalyst outlet means.

Regenerated catalyst may be optionally stripped of adsorbed and interstitial regeneration gas in a regenerated catalyst stripper.

It is well known in the art that the level of residual coke on the regenerated catalyst has a great influence on the conversion and product yield distribution obtained in the reaction zone, especially when coke-sensitive zeolite-containing catalyst are employed in the short contact time, dilute-phase reaction zones. The apparatus of our invention makes it possible not only to produce regenerated catalyst having lower residual coke and therefore higher activity, but also to eliminate the problem of CO pollution without requiring a CO boiler and to recover within the apparatus at least a portion of the heat of CO combustion for advantageous uses within the apparatus and the FCC process.

The recycle of hot regenerated catalyst back to the spent-catalyst receiving chamber increases the rate of coke oxidation and CO conversion thereby making smaller equipment possible. The return of hotter than usual regenerated catalyst to the reaction zone allows possible reduction in feed preheat requirements.

Dramatic catalyst inventory reductions are possible by the apparatus of our invention. As previously described, inventories in regeneration apparatus are directly related to superficial velocities employed within the regeneration apparatus. Since it is not intended in the apparatus of our invention that catalyst in the spent-catalyst receiving chamber remain in that chamber, the superficial velocity of the fresh regeneration gas into the chamber is not limited to the critical velocity. Superficial velocities in the spent-catalyst receiving chamber will be in the range of about 3 to 10 feet per second so that catalyst can be carried from the chamber into he transfer conduit. With superficial velocities now two to three times the critical velocity, catalyst inventories using the apparatus of this invention will be about 40 to 60 percent of those in present regeneration apparatus. As an example, a moderately sized FCC process of the type presently in industry use will contain about 150 tons of catalyst. By using the regeneration apparatus of this invention in an FCC process of the same size, a refiner could save the initial investment represented by at least 75 tons of catalyst.

Catalyst makeup rates required to make up losses and maintain activity will also be reduced with our apparatus since such rates tend to be a percentage of the total catalyst inventory.

Because of higher temperatures which result from the recycle of hot regenerated catalyst, better gas-solid contact due to the higher velocities now permitted and higher oxygen partial pressures, the rate of coke combustion in the apparatus of our invention will be increased and once-through catalyst residence times can be reduced from the present 2 to 5 minutes to less than 2 minutes while regeneration gas residence times can be reduced from about 20 seconds to less than 10 seconds.

Besides permitting smaller equipment size another important result of shorter catalyst residence time is that it may allow the steam stripping of flue gas components from the regenerated catalyst. In spite of the fact that flue gas components are entrained by regenerated catalyst into the reaction zone and hence become part of a product stream, steam stripping of regenerated catalyst has generally not been practiced because of the longer catalyst residence times in conventional regeneration apparatus and because the entire catalyst inventory is generally maintained in a single dense bed within the apparatus. Exposure of this quantity of catalyst to steam for this longer period of time would increase the catalyst deactivation rate.

Thus, the apparatus of our invention overcomes the disadvantages of the prior art regeneration apparatus. With the apparatus of our invention: provision is made for the essentially complete conversion of CO to $CO_2$ within the apparatus thus eliminating a CO disposal problem without the need for a CO boiler; coke oxidation temperatures can be increased without burning external torch oil within the apparatus or employing a fresh regeneration gas preheater; the regenerated catalyst produced contains very low amounts of residual coke; and catalyst inventories and equipment size can be reduced.

Spent catalyst inlet means and fresh-regeneration-gas inlet means are connected to the spent-catalyst receiving chamber to carry the spent catalyst from the reaction zone and fresh regeneration gas into the chamber. Generally these inlet means are conduits which typically may contain distribution devices located on the outlets within the chamber to allow distribution of spent catalyst and fresh regeneration gas within the dense bed of catalyst contained within the chammber in order to promote efficient oxidation of coke from the catalyst. Preferably, the fresh regeneration gas inlet is connected to or passes through a grid located in the lower portion of the chamber to allow distribution of fresh regeneration gas within the dense bed. A regenerated-catalyst/regeneration-gas outlet means is located at the upper portion of the chamber and specifically at the top of the chamber to allow passage of regenerated catalyst and regeneration gas in admixture from the chamber.

The regenerated-catalyst/regeneration-gas outlet means is connected to the inlet of the substantially vertical transfer conduit which is a long cylindrical vessel through which regenerated catalyst and regeneration gas pass in admixture and in which CO is essentially completely converted to $CO_2$ to produce spent regeneration gas with at least part of the heat combustion being transferred to the regenerated catalyst. The substantially vertical configuration of the transfer conduit is preferred for ease in transporting regenerated catalyst and regeneration gas in a uniform dilute-phase flow thereby permitting efficient heat transfer from the gas to the solid catalyst particles.

The cross-sectional area of the transfer conduit will be much smaller than that of the spent-catalyst receiving chamber so that superficial gas velocities within the conduit will be within the range of from about 10 to about 25 feet per second. The transfer conduit may optionally have connected to it combustible-fluid inlet means and fresh-regeneration-gas inlet means to carry external combustible fluid and fresh regeneration gas into the transfer conduit for reasons previously discussed. Typically, these inlet means will be conduits which may contain distribution devices located on their outlets within the transfer conduit to allow distribution of the combustible fluid and fresh regeneration gas within the conduit.

The transfer conduit extends vertically upward through the dense-phase bed of catalyst in the lower portion of the regenerated-catalyst receiving chamber and into the disengaging space within the same chamber. The transfer conduit has an outlet near its upper end to permit passage of the regenerated catalyst and spent regeneration gas from the transfer conduit. The outlet of the transfer conduit will be connected to or in communication with separation means provided to separate regenerated catalyst and spent regeneration gas passing from the transfer conduit. Such separation means may comprise: a disengaging space by itself in which separation is effected by a sudden decrease in superficial velocity of the gas-catalyst mixture exiting the transfer conduit into the chamber; one or more cyclone separation means comprising parallel or series flow arrangements of cyclone separation devices to effect the desired degree of separation; or combinations of a disengaging space and cyclone separation means.

In a preferred embodiment, one or more outlets of the transfer conduit will be directly connected to the inlets of one or more first cyclone separation means to achieve initial quick positive separation. One or more second cyclone separation means will be located in the disengaging space within the regenerated-catalyst receiving chamber to achieve a higher separation efficiency. The inlets of the second cyclone separation means will be located adjacent to but separated from the outlets of the first cyclone separation means to avoid possible overloading of both cyclone separation means during any upset operations.

Separated regenerated catalyst is directed downward toward a dense bed of regenerated catalyst located in the lower portion of the regenerated-catalyst receiving chamber. Regenerated-catalyst outlet means and spent-regeneration-gas outlet means are connected to this chamber at the lower and upper portions respectively to carry regenerated catalyst from the chamber to the reaction zone and spent regeneration gas from the chamber respectively. Typically, these means are conduits which may have control means such as slide valves located thereon to control the flow of catalyst or gas.

The regenerated-catalyst receiving chamber will preferably have attached to it, at the lower portion thereof, a regenerated-catalyst stripper to strip regenerated catalyst of adsorbed and interstitial regeneration gas prior to return of the catalyst from the chamber to the reaction zone. Such a stripper would typically contain baffles over which regenerated catalyst from the dense bed would flow in a downward direction against an upward flow of stripping medium which would generally be steam. When such a stripper is employed, the regenerated-catalyst outlet means would be located at the lower portion or outlet of the stripper to permit the flow of stripped regenerated catalyst from the stripper to the reaction zone.

The definition and purpose of the external regenerated-catalyst recycle means have been previously mentioned. Typically the recycle means will comprise one or more conduits having located thereon a control means, generally a slide valve, to regulate the flow of regenerated catalyst back to the spent-catalyst receiving chamber. Amounts of regenerated catalyst so recycled will be from about 2 to about 150% of the amount of spent catalyst entering the spent-catalyst receiving chamber.

The design of the regeneration apparatus disclosed is such that the spent-catalyst receiving chamber is located at the lowermost portion of the apparatus, while the regenerated-catalyst receiving chamber is placed at the uppermost portion of the apparatus wholly above the spent-catalyst receiving chamber. With this arrangement, regenerated catalyst can be maintained in the regenerated-catalyst receiving chamber at sufficient heat to allow flow of regenerated catalyst both back to the spent-catalyst receiving chamber and to the reaction zone. The transfer conduit is vertically positioned and connects the two chambers. The lower portion of the conduit is wholly between the two chambers and the upper portion extends into and is contained within the regenerated-catalyst receiving chamber.

In a preferred design the spent-catalyst receiving chamber, transfer conduit, and regenerated-catalyst receiving chamber will all be cylindrical and preferably the two chambers and the transfer conduit will be arranged in the manner described above on a common vertical centerline.

Materials of construction for building the apparatus of our invention shall be materials which are able to withstand the attrition conditions inherent in the fluidized-catalyst apparatus and which are able to withstand the high temperatures involved. Specifically, metals such as carbon steel and stainless steel which may or may not be lined with abrasion-resistant refractory linings are contemplated. The spent-catalyst receiving chamber should be so designed and constructed to withstand constant temperatures up to about 1400° F. and temperatures up to about 1500° F. or higher for reasonably short periods of time. The transfer conduit and regenerated-catalyst receiving chamber should be designed to be able to withstand sustained operation of 1400° F. but should also be capable of withstanding shorter-term temperatures as high as 1550° F. to 1600° F. The entire apparatus should also be designed for normal operating pressures of from about atmospheric up to about 50 psig.

We claim as our invention:

1. An apparatus for oxidizing coke on spent catalyst which comprises in combination:
   a. a spent-catalyst receiving chamber for containing a dense-phase fluidized bed of catalyst having an interface maintained within said chamber, said chamber having upper and lower sections, a means for introducing fresh-regeneration-gas into said chamber through said lower section to form said dense-phase fluidized bed, said fresh-regeneration-gas introduction means being connected at the lower section of said spent catalyst receiving chamber, a spent-catalyst inlet means connected to said chamber to allow passage of spent catalyst into said chamber, and a regenerated-catalyst/regeneration-gas outlet means at the top of said upper section of said chamber above the dense phase fluidized bed interface to allow passage of regenerated catalyst and regeneration gas in admixture from said chamber;
   b. a transfer conduit having an upper closed end, an inlet at its lower end connected to said regenerated catalyst/regeneration-gas outlet means, said transfer conduit extending vertically upward from said spent catalyst receiving chamber and extending vertically upward through the lower portion of a hereinafter described regenerated-catalyst receiving chamber into said chamber, and having an outlet adjacent its upper end located within said chamber, said outlet connected to the inlet of a first cyclone separation means whereby regenerated catalyst and regeneration gas are carried in admixture from said spent-catalyst receiving chamber to said separation means and separated thereby;
   c. a regenerated-catalyst receiving chamber for containing separation means and a dense-phase bed of catalyst, said chamber being positioned entirely above said spent-catalyst receiving chamber and having upper and lower sections, a spent-regeneration-gas outlet means connected to said chamber at its upper section to allow passage of spent regeneration gas from said chamber, and a regenerated catalyst stripper connected to said chamber at its lower section, said stripper having connected to its outlet a regenerated-catalyst outlet means to allow passage of regenerated catalyst from said stripper; and,
   d. an external regenerated-catalyst recycle means connected to said regenerated-catalyst receiving chamber and to said spent-catalyst receiving chamber to allow passage of regenerated catalyst from the regenerated-catalyst receiving chamber to the spent-catalyst receiving chamber;
   said spent-catalyst receiving chamber, said transfer conduit, and said regenerated-catalyst receiving chamber being positioned substantially on a common vertical centerline.

2. The apparatus of claim 1 further characterized in that a second cyclone separation means having an inlet located adjacent to the outlet of said first cyclone separation means is located within said regenerated-catalyst receiving chamber.

3. The apparatus of claim 1 further characterized in that said external regenerated-catalyst recycle means comprises at least one conduit having a control means located thereon.

4. The apparatus of claim 1 further characterized in that said transfer conduit has connected thereto a combustible fluid inlet means to allow passage of combustible fluid into said conduit.

5. The apparatus of claim 1 further characterized in that said transfer conduit has connected thereto a fresh regeneration gas inlet means to allow passage of fresh regeneration gas into said conduit.

* * * * *